United States Patent
Wang et al.

(10) Patent No.: US 10,281,807 B2
(45) Date of Patent: May 7, 2019

(54) PROJECTOR, HEAT DISSIPATION MODULE, AND HEAT DISSIPATION FIN SET

(71) Applicant: Coretronic Corporation, Hsin-Chu (TW)

(72) Inventors: Chi-Chuan Wang, Hsin-Chu (TW);
Yung-Ming Li, Hsin-Chu (TW);
Tsung-Ching Lin, Hsin-Chu (TW);
Jhih-Hao Chen, Hsin-Chu (TW);
Wei-Chi Liu, Hsin-Chu (TW);
Shi-Wen Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/869,096

(22) Filed: Jan. 12, 2018

(65) Prior Publication Data
US 2018/0196337 A1    Jul. 12, 2018

(30) Foreign Application Priority Data

Jan. 12, 2017   (CN) .......................... 2017 1 0022231

(51) Int. Cl.
| *G03B 21/14* | (2006.01) |
| *G03B 21/16* | (2006.01) |
| *H01B 7/42* | (2006.01) |

(52) U.S. Cl.
CPC .............. *G03B 21/16* (2013.01); *G03B 21/14* (2013.01); *H01B 7/426* (2013.01)

(58) Field of Classification Search
CPC ......... G03B 21/16; G03B 21/14; H01B 7/426
See application file for complete search history.

(56) References Cited

U.S. PATENT DOCUMENTS

| 5,697,432 A | 12/1997 | Yun et al. |
| 2001/0037875 A1 | 11/2001 | Guerrero |
| 2005/0190538 A1 | 9/2005 | Huang |
| 2006/0169019 A1 | 8/2006 | Kutscher et al. |
| 2010/0053566 A1 | 3/2010 | Yang |
| 2010/0147493 A1 | 6/2010 | Dai et al. |

(Continued)

FOREIGN PATENT DOCUMENTS

| CN | 2530236 | 1/2003 |
| CN | 2636421 | 8/2004 |

(Continued)

*Primary Examiner* — Sultan Chowdhury
*Assistant Examiner* — Magda Cruz
(74) *Attorney, Agent, or Firm* — JCIPRNET

(57) ABSTRACT

A projector includes a casing, an optical engine module, and a heat dissipation module. The optical engine module is disposed in the casing. The heat dissipation module is disposed in the casing and includes a heat dissipation fin set. The heat dissipation fin set includes at least one heat dissipation fin and at least one turbulent structure. The heat dissipation fin has a surface. The surface includes a first turbulent region and a second turbulent region. The first turbulent region is adjacent to the second turbulent region. The turbulent structure is disposed at least one of the first turbulent region and the second turbulent region, and the turbulent structure protrudes from the surface. An opening is formed between a top end of the turbulent structure and the surface.

20 Claims, 15 Drawing Sheets

(56) References Cited

U.S. PATENT DOCUMENTS

2010/0282444 A1* 11/2010 Lin .................... F28D 15/0275
                                                      165/104.26
2013/0228313 A1    9/2013 Fried
2013/0250517 A1    9/2013 Yang et al.
2016/0178283 A1*  6/2016 Wang .................... F28F 13/12
                                                      165/109.1
2017/0097196 A1*  4/2017 Yoo ......................... F28F 3/04

FOREIGN PATENT DOCUMENTS

| CN | 101986203 | 3/2011 |
|----|-----------|--------|
| CN | 202652813 | 1/2013 |
| TW | 200850123 | 12/2008 |
| TW | M354319 | 4/2009 |
| TW | M356102 | 5/2009 |
| TW | M363618 | 8/2009 |
| TW | M408069 | 7/2011 |
| TW | M467084 | 12/2013 |
| WO | 0179776 | 10/2001 |

\* cited by examiner

US 10,281,807 B2

PROJECTOR, HEAT DISSIPATION MODULE, AND HEAT DISSIPATION FIN SET

CROSS-REFERENCE TO RELATED APPLICATION

This application claims the priority benefit of China application serial no. 201710022231.6, filed on Jan. 12, 2017. The entirety of the above-mentioned patent application is hereby incorporated by reference herein and made a part of this specification.

BACKGROUND OF THE INVENTION

1. Field of the Invention

The present invention relates to a projector, a heat dissipation module, and a heat dissipation fin set, and in particular to a projector, a heat dissipation module, and a heat dissipation fin set which are provided with at least one turbulent structure.

2. Description of Related Art

A projector is a display device which is used to generate large-size picture. The imaging principle of the projector depends on a light valve to convert an illuminating beam generated by a light source into an image beam, and then depends on a lens to project the image beam onto a screen or a wall. Since the components, such as the light source and the light valve, in an optical engine of the projector will generate heat energy during operation, a heat dissipation module needs to be mounted to dissipate the heat of these heating components in order to prevent the projector from overheating. The heat dissipation module may include a heat dissipation fin set connected with the heating components, the heat energy generated by the heating components is transferred to the heat dissipation fin set, and natural convection or forced convection provided by a fan is utilized to bring the heat energy out of the projector from the heat dissipation fin set.

With the development of projection technologies, the demand of users on high-brightness low-noise projectors is higher and higher as well. Generally speaking, the higher the brightness of the light source of the projector is, the more heat energy the projector will generate is, and if the rotational speed of the fan is increased correspondingly to enhance heat-dissipating airflow, then the general requirement on the low noise of the projector is violated. In addition, enlarging the volume of the heat dissipation fin set to increase the efficiency of heat dissipation is also a way of overcoming the above-mentioned problem, but it will make the projector have relatively heavy weight and large volume, and as a result, the convenience and safety of mounting and using the projector will be decreased greatly.

The information disclosed in this Background section is only for enhancement of understanding of the background of the described technology and therefore it may contain information that does not form the prior art that is already known to those skilled in the art. Further, the information disclosed in the Background section does not mean that one or more problems to be resolved by one or more embodiments of the invention was acknowledged by those skilled in the art before the application of the invention.

SUMMARY OF THE INVENTION

The invention provides a projector, a heat dissipation module, and a heat dissipation fin set, which may increase the efficiency of heat dissipation.

Other objectives and advantages of the present invention may be further understood from the technical features disclosed in the present invention.

In order to achieve one, some, or all of the aforementioned objectives or other objectives, one embodiment of the invention provides a projector including a casing, an optical engine module, and a heat dissipation module. The optical engine module is disposed in the casing, and the optical engine module includes a light source, a light valve, and a lens. The light source is adapted to generate an illuminating beam. The light valve is adapted to convert the illuminating beam into an image beam. The lens is adapted to convert the image beam into a projection beam. The heat dissipation module is disposed in the casing, and the heat dissipation module includes a heat dissipation fin set. The heat dissipation fin set includes at least one heat dissipation fin and at least one turbulent structure. The heat dissipation fin has a surface, the surface includes a first turbulent region and a second turbulent region, and the first turbulent region is adjacent to the second turbulent region. The turbulent structure is disposed at least one of the first turbulent region and the second turbulent region, and the turbulent structure protrudes from the surface. An opening is formed between a top end of the turbulent structure and the surface.

In order to achieve one, some, or all of the aforementioned objectives or other objectives, one embodiment of the invention provides a heat dissipation module including a heat dissipation fin set. The heat dissipation fin set includes at least one heat dissipation fin and at least one turbulent structure. The heat dissipation fin has a surface, the surface includes a first turbulent region and a second turbulent region, and the first turbulent region is adjacent to the second turbulent region. The turbulent structure is disposed at least one of the first turbulent region and the second turbulent region, and the turbulent structure protrudes from the surface. An opening is formed between a top end of the turbulent structure and the surface.

In order to achieve one, some, or all of the aforementioned objectives or other objectives, one embodiment of the invention provides a heat dissipation fin set including at least one heat dissipation fin and at least one turbulent structure. The heat dissipation fin has at least one surface. The surface includes a first turbulent region and a second turbulent region, and the first turbulent region is adjacent to the second turbulent region. The turbulent structure is disposed at least one of the first turbulent region and the second turbulent region, and the turbulent structure protrudes from the surface. An opening is formed between a top end of the turbulent structure and the surface.

Based on the foregoing, the embodiments of the invention have at least one of the following advantages or efficacies. In the above-mentioned embodiments of the invention, the turbulent structure of the heat dissipation fin set protrudes from the two-dimensional surface of the heat dissipation fin, and the opening is formed in a three-dimensional direction perpendicular to the two-dimensional surface. In the above-mentioned embodiments of the invention, when a heat-dissipating airflow flows through the turbulent structures, each turbulent structure destroys a boundary layer of the heat-dissipating airflow and produces eddies, and besides flowing on the two-dimensional surfaces, the eddies are also guided by the openings to flow in the three-dimensional direction to increase the heat convection efficiency of the heat-dissipating airflow at the heat dissipation fins. Thereby, in the above-mentioned embodiments of the invention, under the condition of not increasing the rotational speed of a fan and the volume of the heat dissipation fin set, the heat dissipation capability of the heat dissipation module may be increased effectively to meet the high-brightness, low-noise and small-size design trend of projectors.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
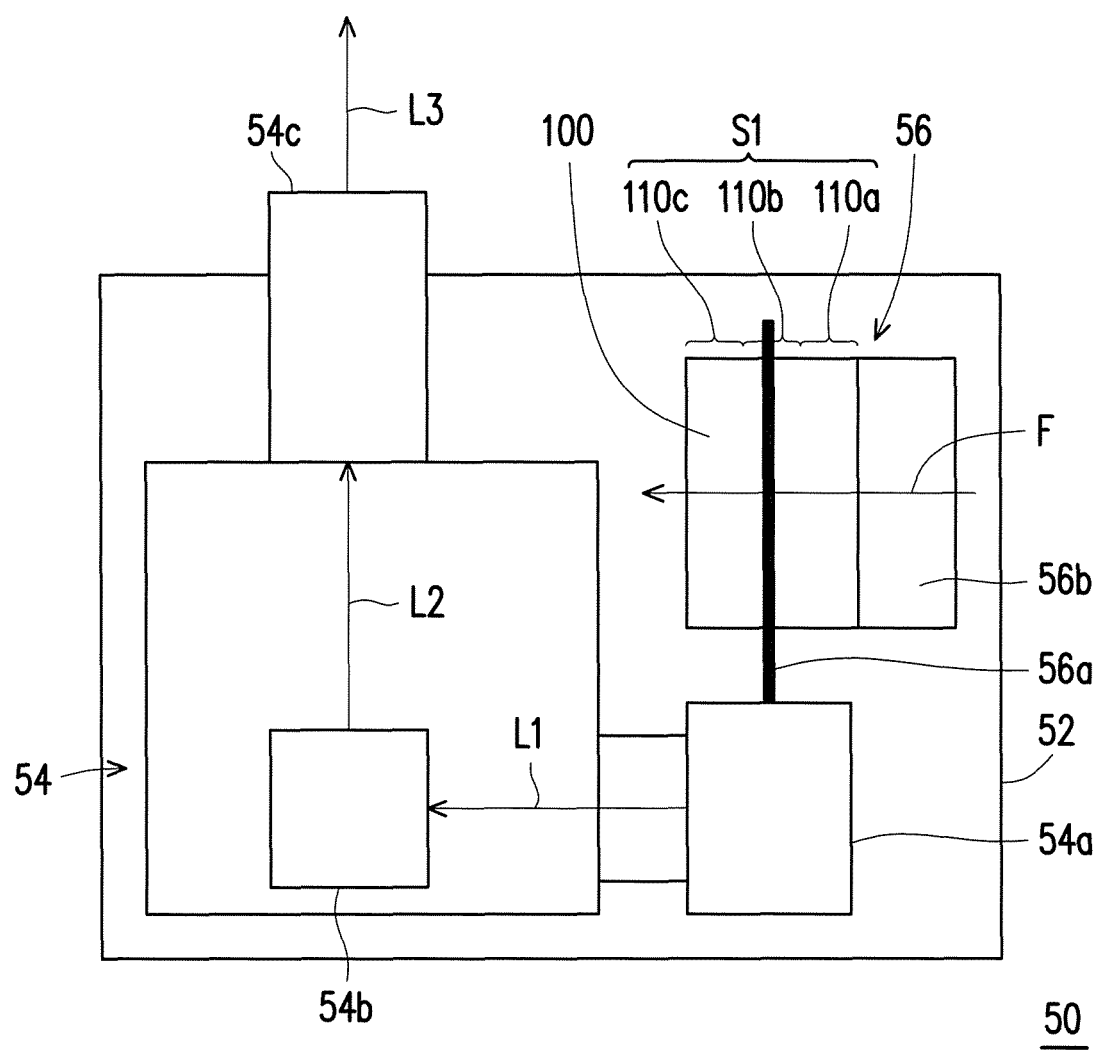
FIG. 1 is a schematic diagram of a projector of one embodiment of the invention.

FIG. 1 is a schematic diagram of a projector of one embodiment of the invention. Referring to FIG. 1, the projector 50 of the embodiment includes a casing 52, an optical engine module 54 and a heat dissipation module 56. The optical engine module 54 is disposed in the casing 52, and includes a light source 54a, a light valve 54b and a lens 54c. The light source 54a is adapted to generate an illuminating beam L1, the light valve 54b is adapted to convert the illuminating beam L1 into an image beam L2, and the lens 54c is adapted to convert the image beam L2 into a projection beam L3. In the embodiment, the heat dissipation module 56 is disposed in the casing 52, and is configured to dissipate the heat of the light source 54a.

More specifically, in the embodiment, the heat dissipation module 56 includes a heat dissipation fin set 100, at least one heat pipe 56a and a fan 56b. In the embodiment, the heat pipe 56a is connected between the light source 54a and the heat dissipation fin set 100, and is configured to transfer the heat produced by the light source 54a to the heat dissipation fin set 100 by the way of heat conduction. In the embodiment, the fan 56b is adjacent to the heat dissipation fin set 100, and is adapted to provide a heat-dissipating airflow F, so that the heat-dissipating airflow F dissipates heat via the heat dissipation fin set 100. In the embodiment, in the flowing direction of the heat-dissipating airflow F, the heat dissipation fin set 100 is located between the fan 56b and the lens 54c, and moreover, the heat dissipation fin set 100 is located between the fan 56b and the optical engine module 54, however, the invention is not limited to this.

Based on the foregoing, the fan 56b in FIG. 1, for example, blows wind toward the heat dissipation fin set 100, so that the heat-dissipating airflow F passes through the heat dissipation fin set 100 from the right to the left. However, the position of the fan 56b in FIG. 1 is not limited in the invention. For example, in another non-drawn embodiment, the fan 56b in FIG. 1 also may be located between the heat dissipation fin set 100 and the lens 54c, and moreover, the fan 56b may suck wind toward the heat dissipation fin set 100, so that the heat-dissipating airflow F may still pass through the heat dissipation fin set 100 from the right to the left, that is, the heat-dissipating airflow F produced by the fan 56b may pass through the heat dissipation fin set 100 to dissipate heat. In other unshown embodiments, the fan 56b may also be arranged at other appropriate positions to provide/produce the heat-dissipating airflow F, so that the heat-dissipating airflow F passes through the heat dissipation fin set 100.

In addition, in the other non-drawn embodiments, another heat dissipation fin set 100 and another heat pipe 56a also may be further arranged in FIG. 1, that is, two heat dissipation fin sets 100 and two heat pipes 56a are arranged, moreover, the fan 56b is arranged between the two heat dissipation fin sets 100, one end of each of the two heat pipes 56a is connected with the light source 54a, and the other ends of the two heat pipes 56a are respectively connected with the two heat dissipation fin sets 100; that is, one of the heat pipes 56a is connected between the light source 54a and one of the heat dissipation heat dissipation fin sets 100, and the other heat pipe 56a is connected between the light source 54a and the another heat dissipation fin set 100.

Figure 2:
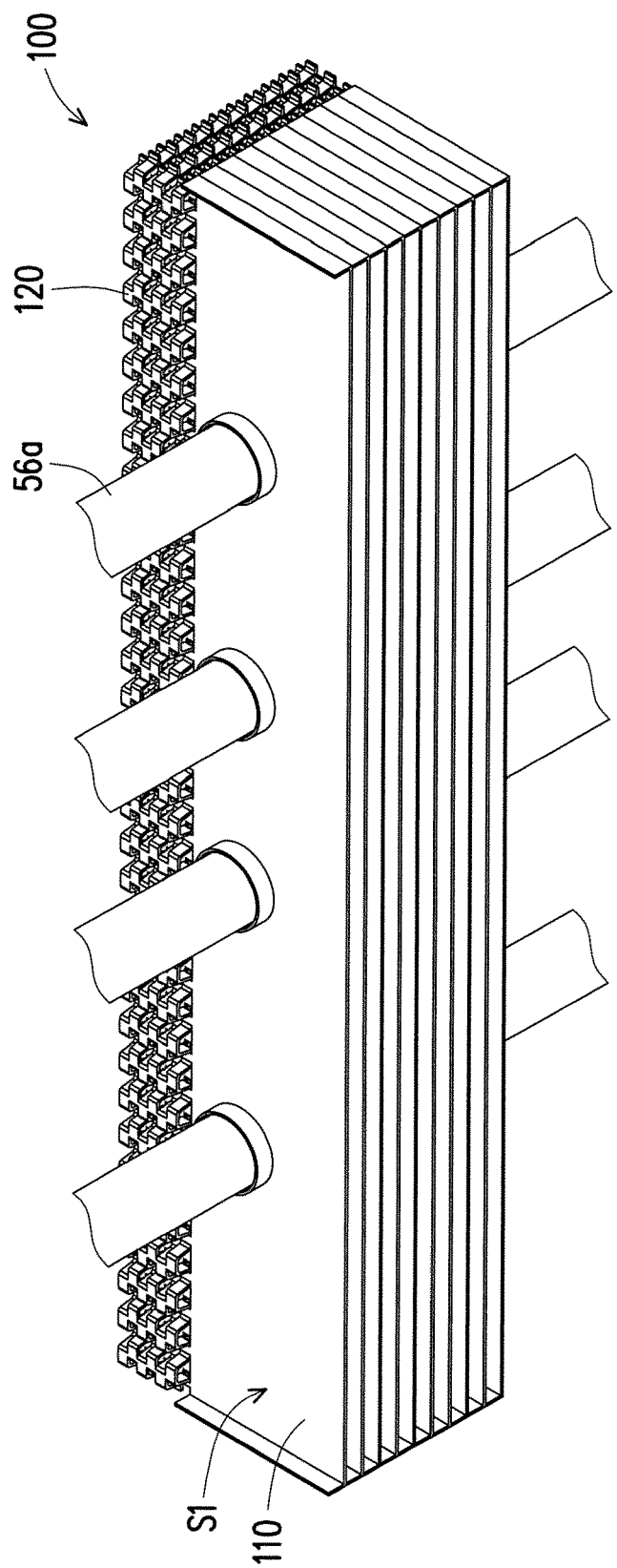
FIG. 2 is a three-dimensional diagram of the heat dissipation fin set and the heat pipe of FIG. 1.
Figure 3A:
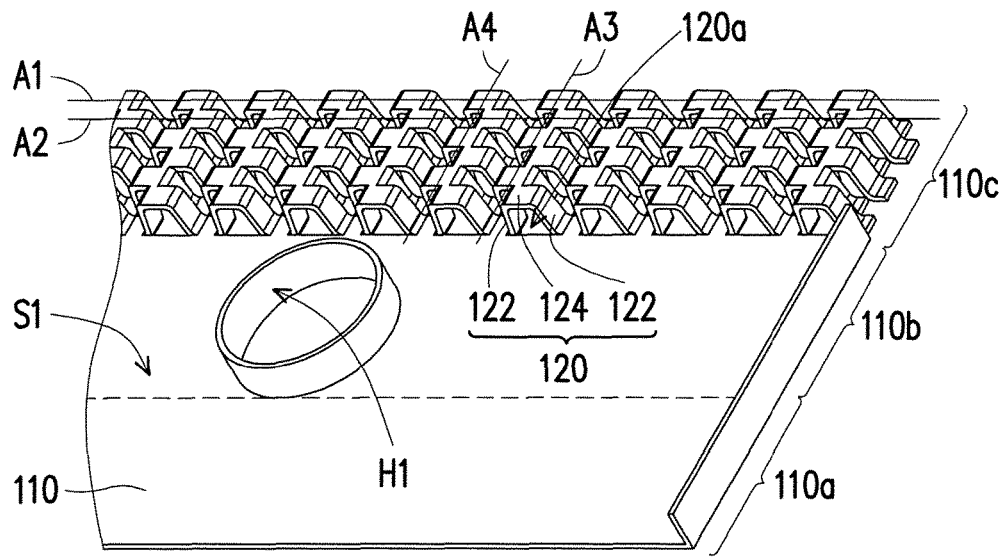
FIG. 3A is a partial enlarged diagram of a heat dissipation fin of FIG. 2.
Figure 3B:
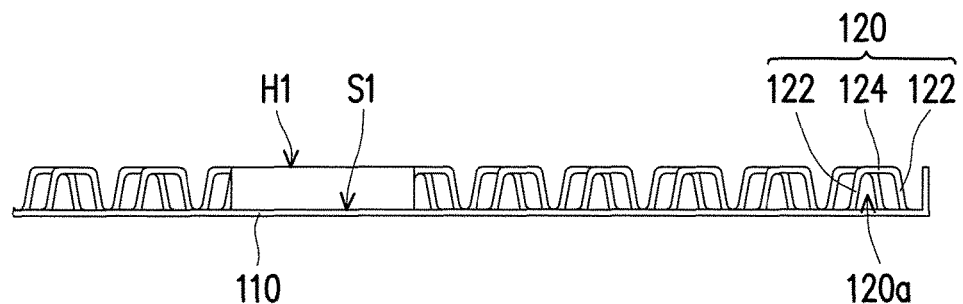
FIG. 3B and FIG. 3C are respectively a side view and a top view of the heat dissipation fin of FIG. 3A.
Figure 3C:
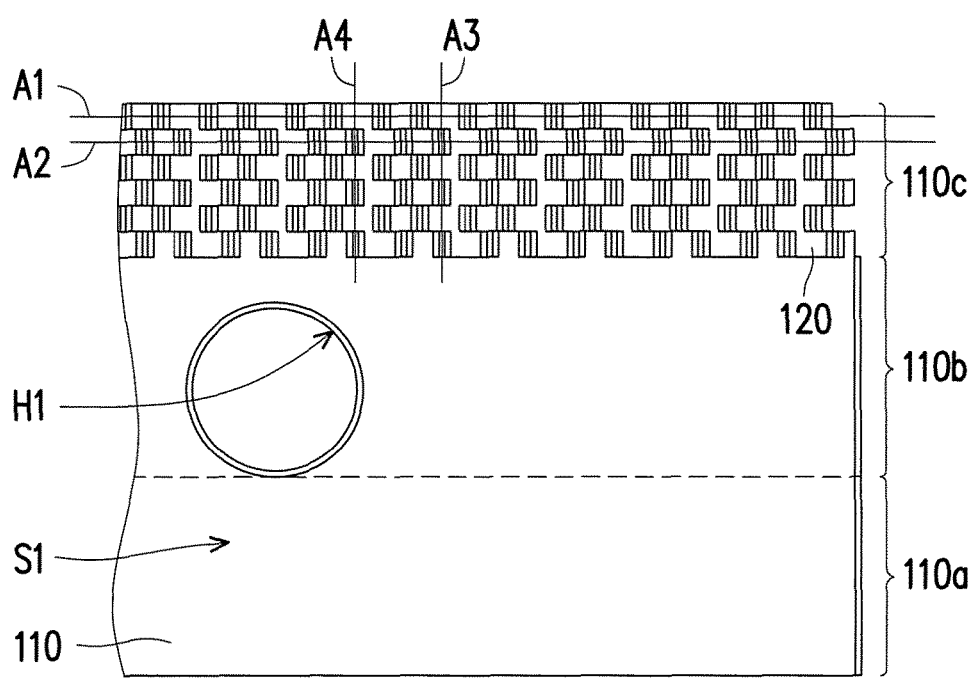

FIG. 2 is a three-dimensional diagram of the heat dissipation fin set and the heat pipe of FIG. 1. FIG. 3A is a partial enlarged diagram of a heat dissipation fin of FIG. 2. FIG. 3B and FIG. 3C are respectively a side view and a top view of the heat dissipation fin of FIG. 3A. Referring to FIG. 2 to FIG. 3C, the heat dissipation fin set 100 of the embodiment includes at least one heat dissipation fin 110 (a number of fins 110 drawn as an example) and at least one turbulent structure 120 (a number of turbulent structures 120 drawn as an example). In the embodiment, the quantity of the at least one heat dissipation fin 110 is multiple, and the fins 110 are mutually stacked as shown in FIG. 2. In the embodiment, each heat dissipation fin 110 has a surface S1, the surface S1, as shown in FIG. 3A and FIG. 3C for example, includes a non-turbulent region 110a, a first turbulent region 110c, and a second turbulent region 110b. The second turbulent region 110b is located between the first turbulent region 110c and the non-turbulent region 110a. The non-turbulent region 110a is adjacent to the second turbulent region 110b, and the first turbulent region 110c is adjacent to the second turbulent region 110b. In the embodiment, the non-turbulent region 110a has no turbulent structure, and each heat pipe 56a (drawn in FIG. 2) is connected with the second turbulent region 110b by passing through a hole H1 of the second turbulent region 110b. In the embodiment, the turbulent structures 120, for example, are disposed at in the first turbulent region 110c, wherein each turbulent structure 120, for example, is connected with the heat dissipation fin 110 integrally, or each turbulent structure 120 is fixed on the heat dissipation fin 110 in a bonding manner (such as welding), but is not limited. In order to make the drawings clearer, the non-turbulent region 110a and the second turbulent region 110b are divided by a dotted line in FIG. 3A and FIG. 3C.

As shown in FIG. 1, in the embodiment, the non-turbulent region 110a is located between the fan 56b and the second turbulent region 110b, and the second turbulent region 110b is located between the fan 56b and the first turbulent region 110c, so that the heat-dissipating airflow F first flows from the non-turbulent region 110a to the second turbulent region 110b, and then flows from the second turbulent region 110b to the first turbulent region 110c. That is, in the embodiment, in terms of the direction of the flowing path of the heat-dissipating airflow F, the non-turbulent region 110a, the second turbulent region 110b, and the first turbulent region 110c are an upstream area, a midstream area, and a downstream area in sequence.

Referring to FIG. 3A and FIG. 3B, each turbulent structure 120 of the embodiment includes a connecting portion 124 and two supporting portions 122, and the two supporting portions 122 of each turbulent structure 120 protrude from the surface S1. In the embodiment, in terms of each turbulent structure 120, the connecting portion 124 is connected between the two supporting portions 122, the top end of the turbulent structure 120 is located at the connecting portion 124, and an opening 120a is formed among the connecting portion 124 (i.e. the top end of the turbulent structure 120), the two supporting portions and the surface S1. That is, the turbulent structures 120 of the heat dissipation fin set 100 protrude from the surfaces S1 of the heat dissipation fins 110, while the opening 120a is formed in a three-dimensional direction perpendicular to each surface S1. When the heat-dissipating airflow F (drawn in FIG. 1) flows through the turbulent structures 120, each turbulent structure 120 destroys the boundary layer of the heat-dissipating airflow F and produces an eddy; besides flowing on the surfaces S1, the eddies are also guided by the openings 120a to flow in the three-dimensional direction to increase the heat convection efficiency of the heat-dissipating airflow F at the heat dissipation fins 110; and the so-called three-dimensional direction means a direction perpendicular to the surface S1. Thereby, in the embodiment, under the condition of not increasing the rotational speed of the fan 56b and the volume of the heat dissipation fin set 100, the heat dissipation capability of the heat dissipation module 56 may be increased effectively to meet the high-brightness, low-noise and small-size design trend of projectors. In addition, in the embodiment, since the upstream area (i.e. the non-turbulent region 110a) of the heat-dissipating airflow F has no turbulent structure, the turbulent structure may be prevented from interfering with the flow of the heat-dissipating airflow F in the upstream area to decrease the efficiency of the heat-dissipating airflow F flowing toward the midstream area and the downstream area.

The turbulent structures 120 of the embodiment are arranged approximately into an array, and in the other embodiments, the turbulent structures 120 of different rows or the turbulent structures 120 of different columns may be so arranged as to be staggered from one another or aligned with one another. More specifically, as shown in FIG. 3A and FIG. 3C, in the embodiment, the shape of the first turbulent region 110c, for example, is rectangular, two axes A1 and A2 which are parallel to each other, for example, respectively pass through two rows of the array formed by the arranged turbulent structures 120, part of the turbulent structures 120, for example, are arranged along the axis A1, the other part of the turbulent structures 120, for example, are arranged along the other axis A2, moreover, the turbulent structures 120 on the axis A1 are staggered left and right from the turbulent structures 120 on the other axis A2, however, the invention is not limited to this. In the embodiment, left-right staggering means a relative offset in the extending direction of the axes A1 and A2. In addition, in the embodiment, two axes A3 and A4 which are parallel to each other respectively pass through the other two columns of the array formed by the arranged turbulent structures 120, part of the turbulent structures 120, for example, are arranged along the axis A3, the other part of the turbulent structures 120, for example, are arranged along the other axis A4, moreover, the turbulent structures 120 on the axis A3 are aligned with the turbulent structures 120 on the other axis A4, however, the invention is still not limited to this. In the embodiment, the axes A1 and A2, for example, are perpendicular to the flowing direction of the heat-dissipating airflow F shown in FIG. 1, the axes A3 and A4, for example, are parallel to the flowing direction of the heat-dissipating airflow F shown in FIG. 1, however, the invention is not limited to this, that is, each axis also may be not parallel to or perpendicular to the flowing direction, and examples are described below. In some embodiments (not shown in the drawings), the axis A1 may also be unparallel to the axis A2, while part of the turbulent structures 120 arranged along the axis A1, for example, are not parallel to part of the turbulent structures 120 arranged along the axis A2. In part of the embodiments, the axis A3 also may be unparallel to the axis A4, while part of the turbulent structures 120 arranged along the axis A3, for example, are not parallel to part of the turbulent structures 120 arranged along the axis A4. In the other part of the embodiments, part of the turbulent structures 120 also may be arranged in a direction unparallel to the axis A1, the axis A2, the axis A3 or the axis A4. In the other embodiments, the shape of the first turbulent region 110c, for example, is wedged, and each row of turbulent structures 120 located in the first turbulent region 110c, for example, are not parallel to one another.

Figure 4A:
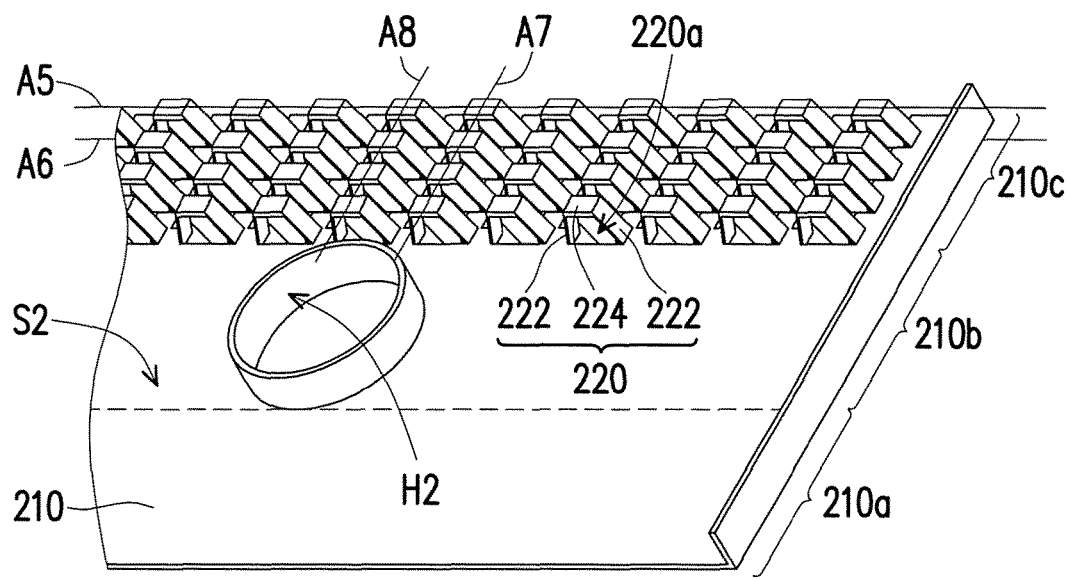
FIG. 4A is a partial enlarged diagram of a heat dissipation fin of another embodiment of the invention.
Figure 4B:
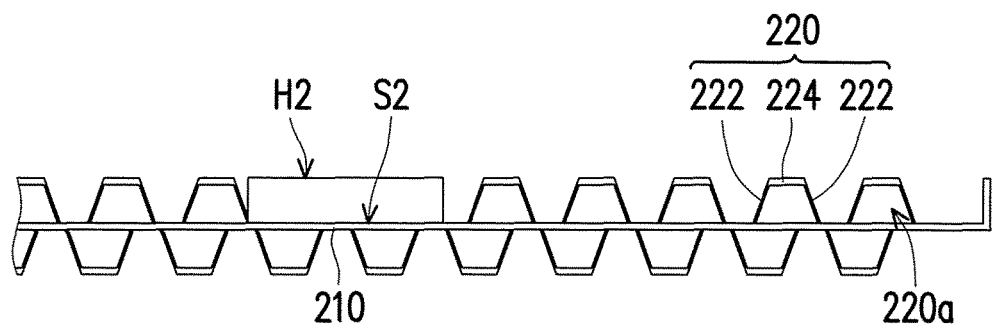
FIG. 4B and FIG. 4C are respectively a side view and a top view of the heat dissipation fin of FIG. 4A.
Figure 4C:
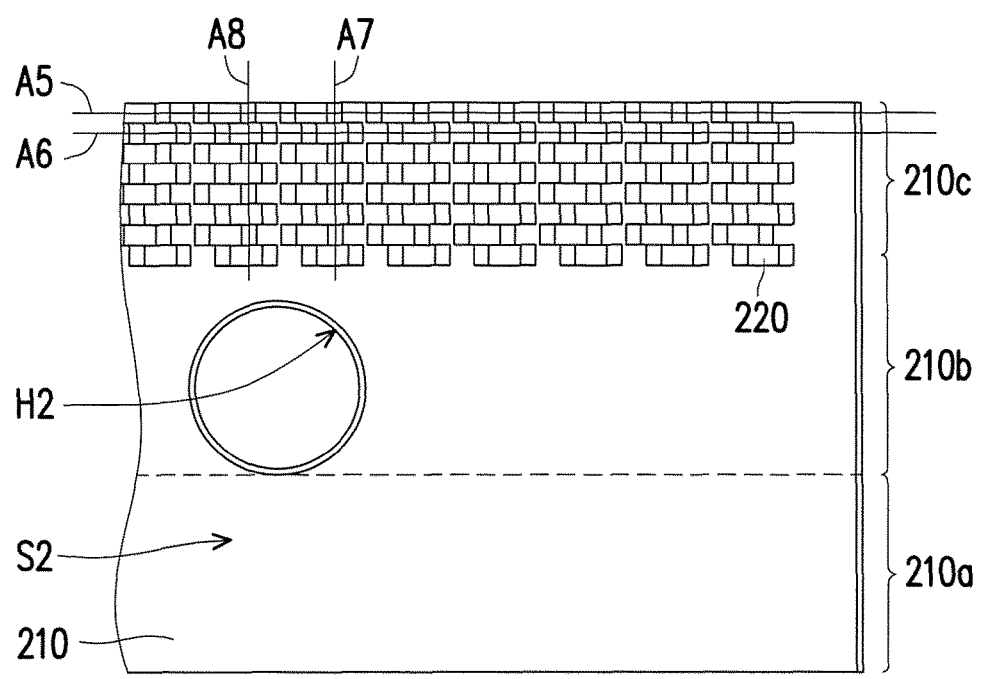

Other structural forms of the turbulent structure are described below in reference to the drawings. FIG. 4A is a partial enlarged diagram of a heat dissipation fin of another embodiment of the invention. FIG. 4B and FIG. 4C are respectively a side view and a top view of the heat dissipation fin of FIG. 4A. In the heat dissipation fin 210 shown in FIG. 4A, FIG. 4B and FIG. 4C, the configuration and action modes of axes A5, A6, A7 and A8, a surface S2, a hole H2, a non-turbulent region 210a, a second turbulent region 210b, a first turbulent region 210c, turbulent structures 220, supporting portions 222, connecting portions 224 and openings 220a are similar to the configuration and action modes of the axes A1, A2, A3 and A4, the surface S1, the hole H1, the non-turbulent region 110a, the second turbulent region 110b, the first turbulent region 110c, the turbulent structures 120, the supporting portions 122, the connecting portions 124 and the openings 120a shown in FIG. 3A, FIG. 3B and FIG. 3C, and the descriptions thereof are omitted herein. The main difference of the heat dissipation fin 210 from the heat dissipation fin 110 is that the axis A5 and the axis A6 in the embodiment are not located on the same side of the heat dissipation fin 210, but are respectively located on the opposite upper and lower sides of the heat dissipation fin 210. That is, in the embodiment, besides staggering left and right, the turbulent structures 220 corresponding to the axis A5 and the turbulent structures 220 corresponding to the axis A6 are staggered up and down so as to be respectively located on the opposite upper and lower sides of the heat dissipation fin 210. In the embodiment, up-down staggering means a relative offset in a direction perpendicular to a plane S. In addition, in the embodiment, the axis A5, for example, is parallel to the axis A6, the axis A7, for example, is parallel to the axis A8, part of the turbulent structures 220 arranged along the axis A5, for example, are parallel to part of the turbulent structures 220 arranged along the axis A6, moreover, part of the turbulent structures 220 arranged along the axis A7, for example, are parallel to part of the turbulent structures 220 arranged along the axis A8, but the invention is not limited to this. However, in some embodiments, the axis A5 also may be unparallel to the axis A6, while part of the turbulent structures 220 arranged along the axis A5, for example, are unparallel to part of the turbulent structures 220 arranged along the axis A6. In part of the embodiments, the axis A7 also may be unparallel to the axis A8, while part of the turbulent structures 220 arranged along the axis A7, for example, are not parallel to part of the turbulent structures 220 arranged along the axis A8.

Figure 5A:
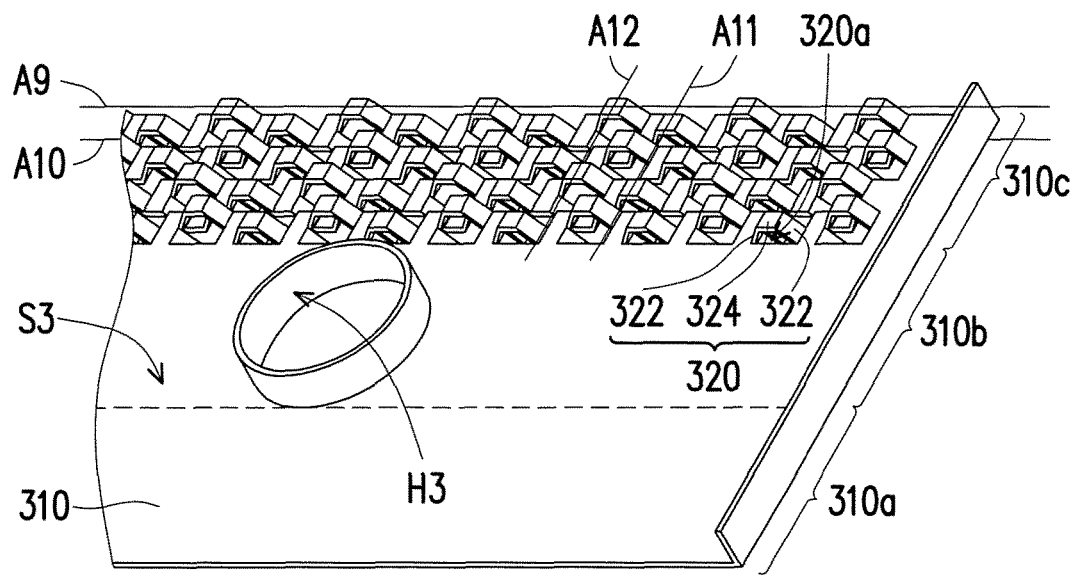
FIG. 5A is a partial enlarged diagram of a heat dissipation fin of another embodiment of the invention.
Figure 5B:
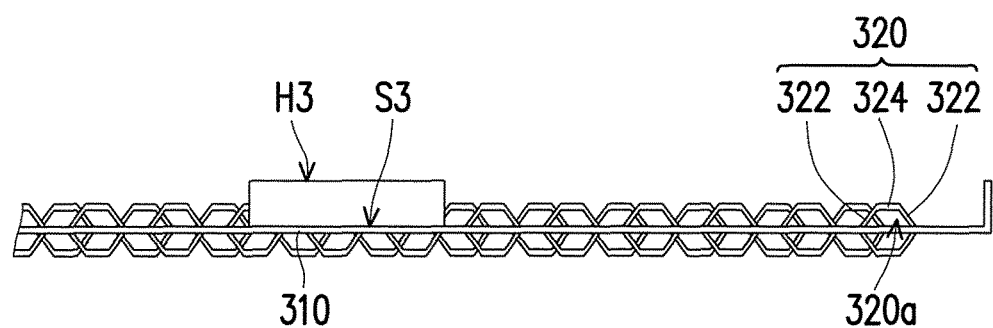
FIG. 5B and FIG. 5C are respectively a side view and a top view of the heat dissipation fin of FIG. 5A.
Figure 5C:
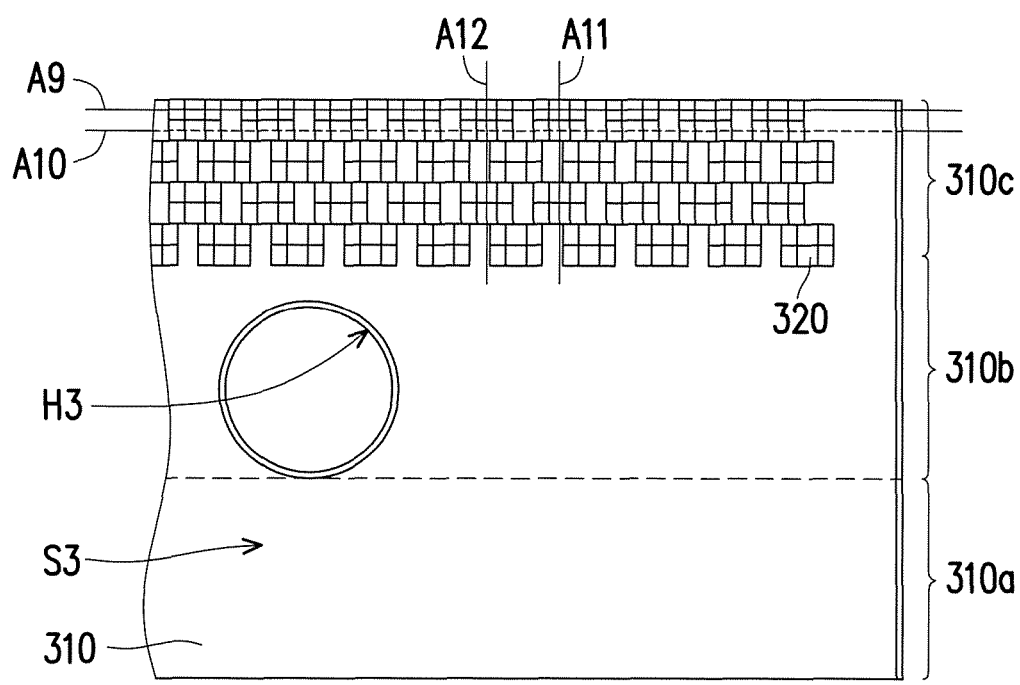

FIG. 5A is a partial enlarged diagram of a heat dissipation fin of another embodiment of the invention. FIG. 5B and FIG. 5C are respectively a side view and a top view of the heat dissipation fin of FIG. 5A. In the heat dissipation fin 310 shown in FIG. 5A, FIG. 5B and FIG. 5C, the configuration and action modes of the axes A9, A10, A11 and A12, a surface S3, a hole H3, a non-turbulent region 310a, a second turbulent region 310b, a first turbulent region 310c, turbulent structures 320, supporting portions 322, connecting portions 324 and openings 320a are similar to the configuration and action modes of the axes A1, A2, A3 and A4, the surface S1, the hole H1, the non-turbulent region 110a, the second turbulent region 110b, the first turbulent region 110c, the turbulent structures 120, the supporting portions 122, the connecting portions 124 and the openings 120a shown in FIG. 3A, FIG. 3B and FIG. 3C, and the descriptions thereof are omitted herein. The main difference of the heat dissipation fin 310 from the heat dissipation fin 110 is that in the embodiment, the axis A9 and the axis A10 are not located on the same side of the heat dissipation fin 310, but are respectively located on the opposite upper and lower sides of the heat dissipation fin 310. That is, in the embodiment, the turbulent structures 320 corresponding to the axis A9 and the turbulent structures 320 corresponding to the axis A10 are staggered up and down so as to be respectively located on the opposite upper and lower sides of the heat dissipation fin 210. In addition, in the embodiment, the turbulent structures 320 corresponding to the axis A9 and the turbulent structures 320 corresponding to the axis A10 are not staggered left and right. Moreover, in the embodiment, the turbulent structures 320 corresponding to the axis A11 and the turbulent structures 320 corresponding to the axis A12 are staggered longitudinally but not staggered vertically. In the embodiment, front-back staggering means a relative offset in the extending direction of the axes A11 and A12. In addition, in the embodiment, the axis A9, for example, is parallel to the axis A10, the axis A11, for example, is parallel to the axis A12, part of the turbulent structures 320 arranged along the axis A9, for example, are parallel to part of the turbulent structures 320 arranged along the axis A10, moreover, part of the turbulent structures 320 arranged along the axis A11, for example, are parallel to part of the turbulent structures 320 arranged along the axis A12, but the invention is not limited to this. However, in some embodiments, the axis A9 may also be unparallel to the axis A10, while part of the turbulent structures 320 arranged along the axis A9, for example, are not parallel to part of the turbulent structures 320 arranged along the axis A10. In part of the embodiments, the axis A11 may also be unparallel to the axis A12, while part of the turbulent structures 320 arranged along the axis A11, for example, are not parallel to part of the turbulent structures 320 arranged along the axis A12.

Figure 6A:
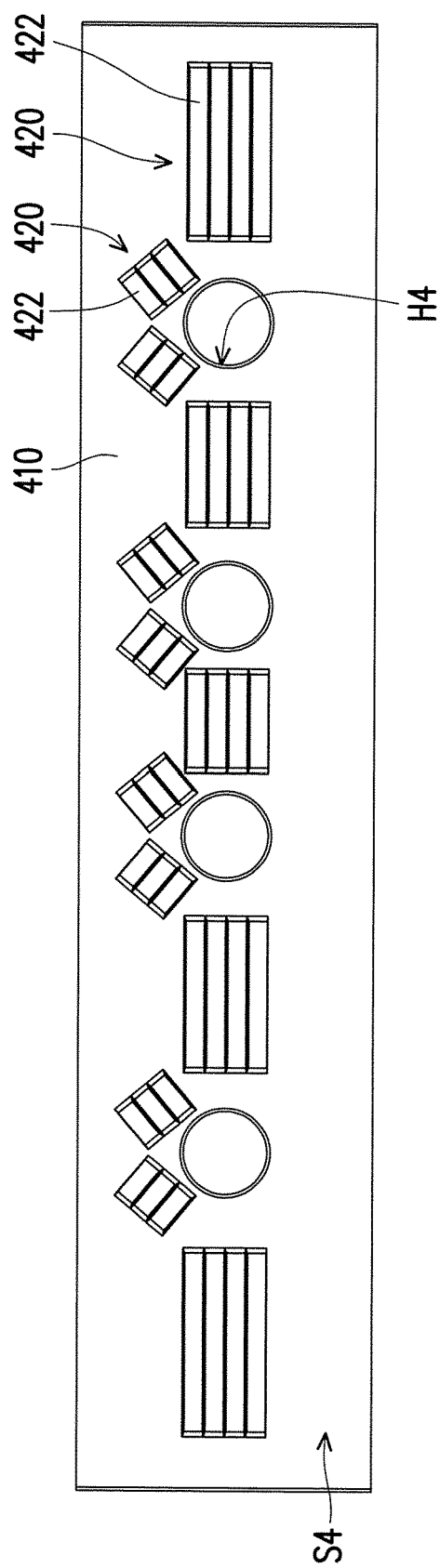
FIG. 6A is a top view of a heat dissipation fin of another embodiment of the invention.
Figure 6B:
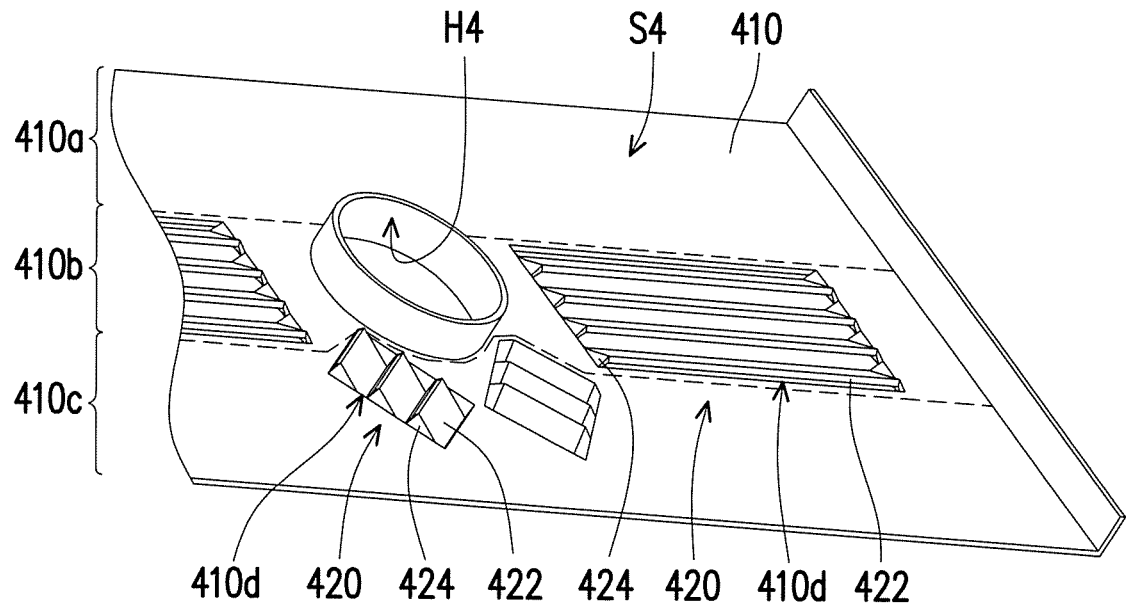
FIG. 6B is a partial three-dimensional diagram of the heat dissipation fin of FIG. 6A.
Figure 6C:
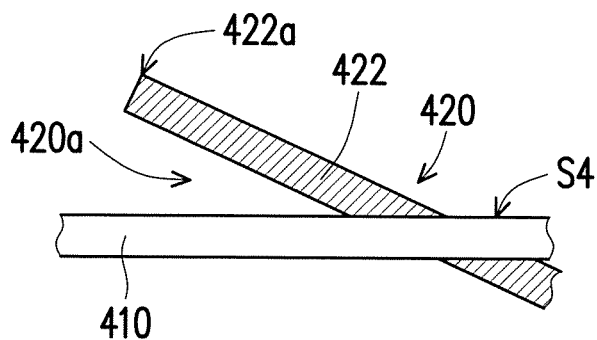
FIG. 6C is a partial structural cross-sectional diagram of the heat dissipation fin of FIG. 6B.

FIG. 6A is a top view of a heat dissipation fin of another embodiment of the invention. FIG. 6B is a partial three-dimensional diagram of the heat dissipation fin of FIG. 6A. FIG. 6C is a partial structural cross-sectional diagram of the heat dissipation fin of FIG. 6B. A plate 422 (drawn as inclined cross section lines) of a turbulent structure 420 in FIG. 6C and a heat dissipation fin 410 (not having cross section lines) are not located on the same cross section, and in order to clearly describe the relative relation between the plate 422 of the turbulent structure 420 and the heat dissipation fin 410, both the plate 422 of the turbulent structure 420 and the heat dissipation fin 410 are drawn in FIG. 6C. In the heat dissipation fin 410 in FIG. 6A, FIG. 6B and FIG. 6C, the configuration and action modes of a surface S4, a hole H4, a non-turbulent region 410a, a second turbulent region 410b, a first turbulent region 410c, turbulent structures 420 and openings 420a are similar to the configuration and action modes of the surface S1, the hole H1, the non-turbulent region 110a, the second turbulent region 110b, the first turbulent region 110c, the turbulent structures 120 and the openings 120a shown in FIG. 3A, FIG. 3B and FIG. 3C, and the descriptions thereof are omitted herein. The main difference of the heat dissipation fin 410 from the heat dissipation fin 110 is that in the embodiment, the heat dissipation fin 410 has at least one slot 410d (a plurality of slots 410d drawn as an example), each turbulent structure 420 includes a plate 422 and two supporting portions 424, the plate 422 is inclined relative to the surface S4 and has a free end 422a, the two opposite sides of the plate 422 are connected with the inner edge of the slot 410d respectively by the two supporting portions 424, and the free end 422a forms the top end of the turbulent structure 420. In the embodiment, the opening 420a is formed between the top end (i.e. the free end 422a) of the turbulent structure 420 and the surface S4. In addition, in the embodiment, as shown in FIG. 6B, part of the turbulent structures 420 are disposed at the first turbulent region 410c, and the other part of the turbulent structures 420 are disposed at the second turbulent region 410b. However, the invention is not limited to this, and in the other embodiments, the turbulent structures 420 may also be disposed only at the first turbulent region 410c, or the turbulent structures 420 may be disposed only at the second turbulent region 410b. This is described in detail below in reference to the drawings.

Figure 7:
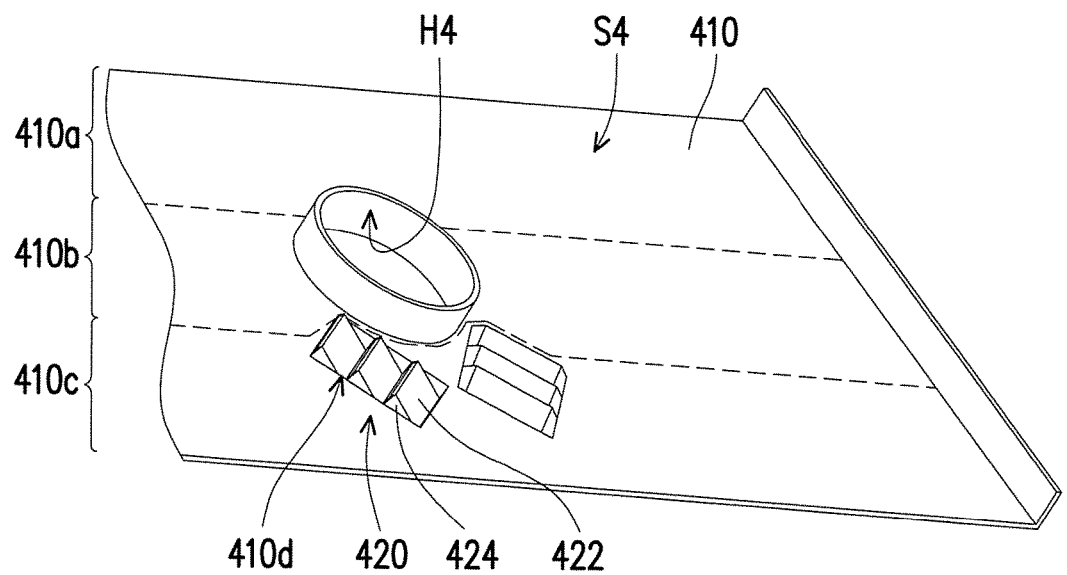
FIG. 7 is a partial three-dimensional diagram of a heat dissipation fin of another embodiment of the invention.

FIG. 7 is a partial three-dimensional diagram of a heat dissipation fin of another embodiment of the invention. As shown in FIG. 7, in the embodiment, the turbulent structures 420 are configured in the first turbulent region 410c, while the turbulent structures 420 are not configured in the second turbulent region 410b.

Figure 8:
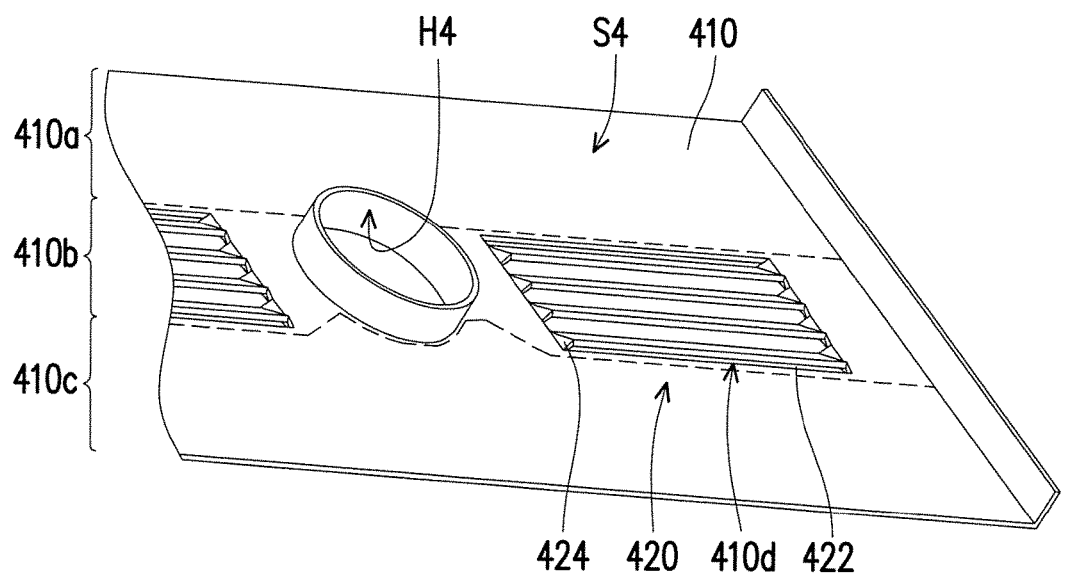
FIG. 8 is a partial three-dimensional diagram of a heat dissipation fin of another embodiment of the invention.

FIG. 8 is a partial three-dimensional diagram of a heat dissipation fin of another embodiment of the invention. As shown in FIG. 8, in the embodiment, the turbulent structures 420 are configured in the second turbulent region 410b, while turbulent structures 420 are not configured in the first turbulent region 410c.

Figure 9:
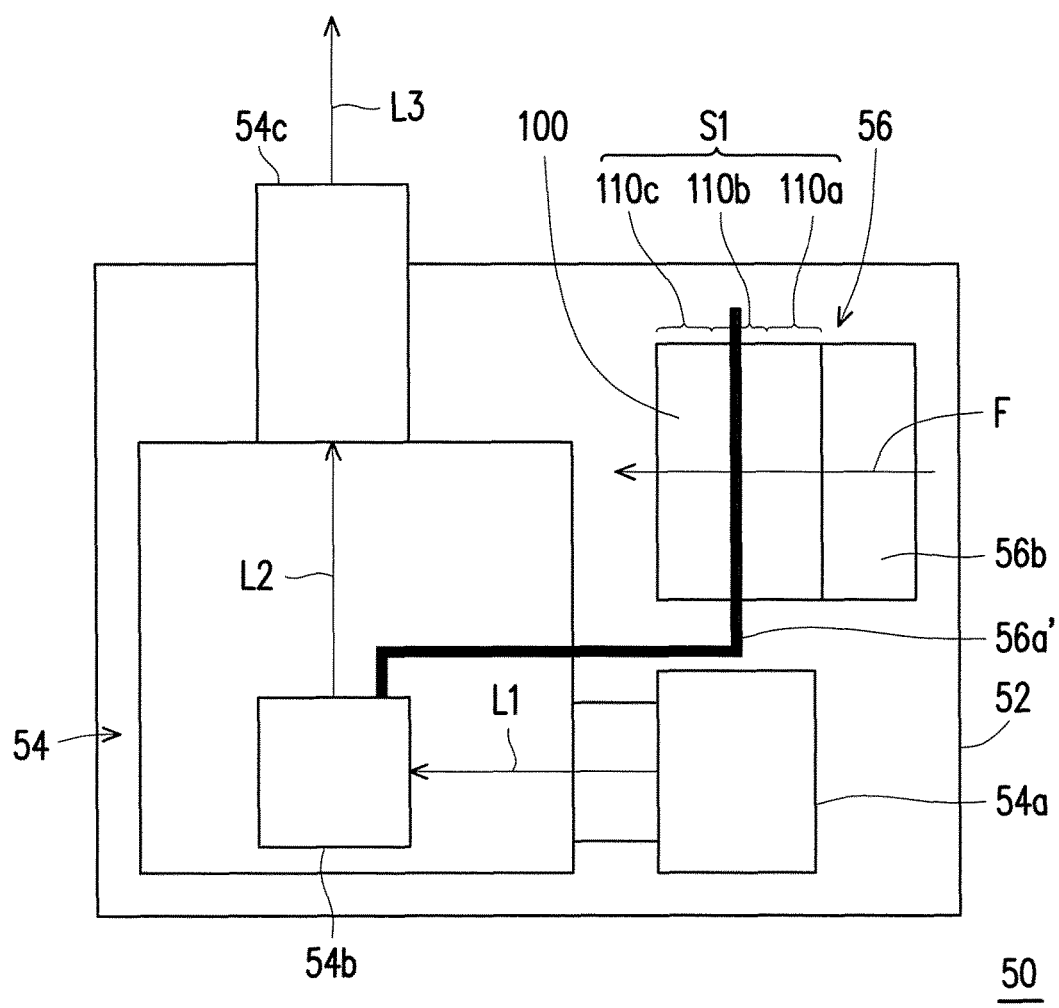
FIG. 9 is a schematic diagram of a projector of another embodiment of the invention.

FIG. 9 is a schematic diagram of a projector of another embodiment of the invention. The main difference of the embodiment shown in FIG. 9 from the embodiment shown in FIG. 1 is that the heat dissipation module 56 in FIG. 1 is configured to dissipate the heat of the light source 54a, while the heat dissipation module 56 in FIG. 9 is configured to dissipate the heat of the light valve 54b. More specifically, in the embodiment of FIG. 9, a heat pipe 56a' is not connected to the light source 54a, but is connected to the light valve 54b. In the embodiment, by connecting the heat pipe 56a' between the heat dissipation fin set 100 and the light valve 54b, the heat dissipation module 56 may be utilized to dissipate the heat of the light valve 54b. In addition, similar to the embodiment of FIG. 1, in part of the non-drawn embodiments, the fan 56b in FIG. 9 also may be located between the heat dissipation fin set 100 and the lens 54c. Or, in the other non-drawn embodiments, the fan 56b also may be arranged at other appropriate positions to provide/produce the heat-dissipating airflow F, so that the heat-dissipating airflow F passes through the heat dissipation fin set 100. In addition, in the other non-drawn embodiments, another heat dissipation fin set 100 and another heat pipe 56a' also may be further arranged in FIG. 9, that is, two heat dissipation fin sets 100 and two heat pipes 56a' are arranged, moreover, the fan 56b is arranged between the two heat dissipation fin sets 100, one end of each of the two heat pipes 56a' is connected with the light valve 54b, and the other ends of the two heat pipes 56a' are connected respectively with the two heat dissipation fin sets 100; that is, one of the heat pipes 56a' is connected between the light valve 54b and one of the heat dissipation heat dissipation fin sets 100, and the other heat pipe 56a' is connected between the light valve 54b and the another heat dissipation fin set 100.

Figure 10:
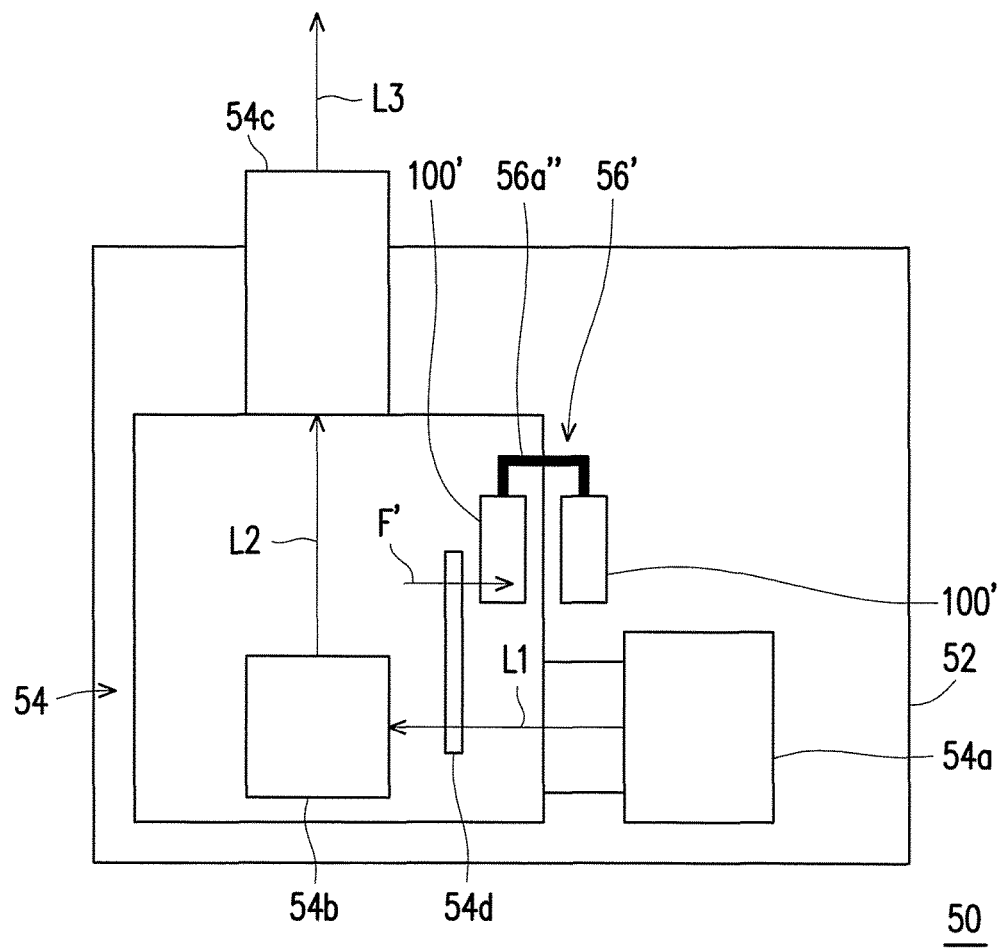
FIG. 10 is a schematic diagram of a projector of another embodiment of the invention.

FIG. 10 is a schematic diagram of a projector of another embodiment of the invention. The main difference of the embodiment shown in FIG. 10 from the embodiment shown in FIG. 1 is that the heat dissipation module 56 in FIG. 1 is configured to dissipate the heat of the light source 54a, while a heat dissipation module 56' in FIG. 10 is configured to dissipate the heat of a phosphor wheel 54d. More specifically, in the embodiment of FIG. 10, the optical engine module 54 further includes the phosphor wheel 54d, and the phosphor wheel 54d is configured to convert the wavelength of the illuminating beam L1. In the embodiment, the heat dissipation module 56' further includes another heat dissipation fin set 100', that is, the heat dissipation module 56', for example, includes two heat dissipation fin sets 100', the two heat dissipation fin sets 100' are respectively located inside and outside the optical engine module 54, and the heat-dissipating airflow F' is used to flow from the phosphor wheel 54d to the heat dissipation fin set 100' inside the optical engine module 54. In the embodiment, a heat pipe 56a'' is connected between the two heat dissipation fin sets 100' to transfer the heat of the heat dissipation fin set 100' inside the optical engine module 54 to the heat dissipation fin set 100' outside the optical engine module 54. The heat-dissipating airflow F' may be provided by the fan configured at an appropriate position, and the invention does not limit this.

Based on the foregoing, in the other non-drawn embodiments, one of the two heat dissipation fin sets 100' in FIG. 10 may have no turbulent structures. For example, in one non-drawn embodiment, the heat dissipation fin set 100' located inside the optical engine module 54 has the turbulent structures, while the heat dissipation fin set 100' located outside the optical engine module 54 has no turbulent structures. In another non-drawn embodiment, the heat dissipation fin set 100' located inside the optical engine module 54 has no turbulent structures, while the heat dissipation fin set 100' located outside the optical engine module 54 has the turbulent structures. In addition, the heat pipe 56a'' in FIG. 10 also may be replaced by other suitable heat-conducting elements, that is, the invention does not limit the form of the heat-conducting elements between the two heat dissipation fin sets 100'.

Figure 11A:
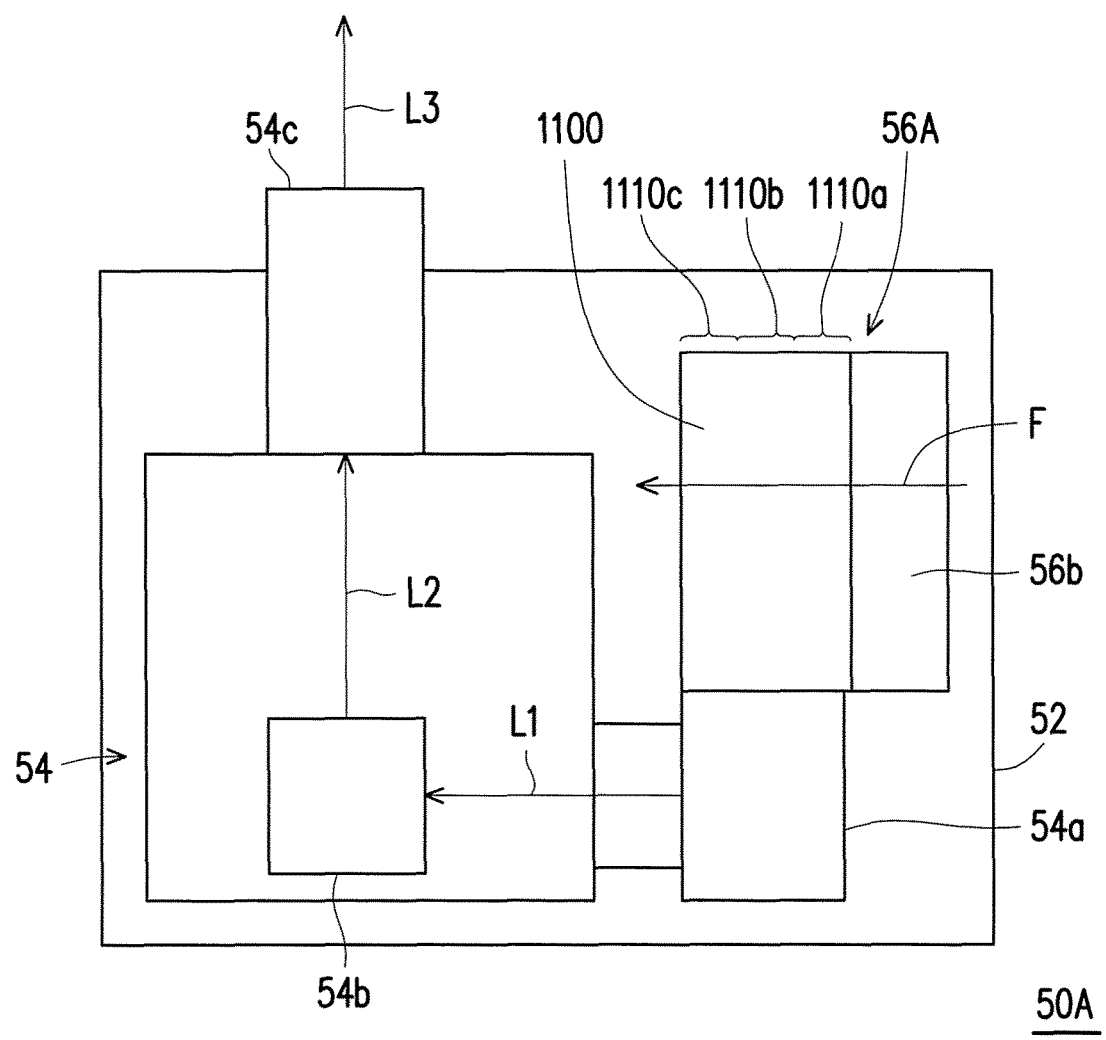
FIG. 11A is a schematic diagram of a projector of another embodiment of the invention.
Figure 11B:
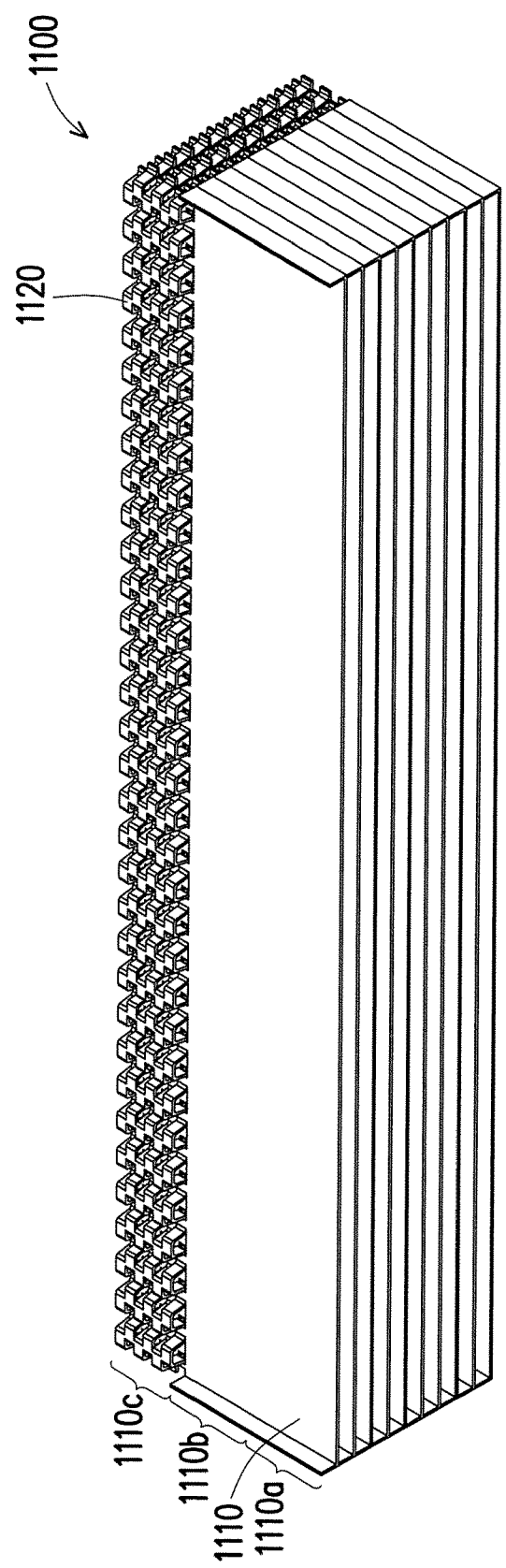
FIG. 11B is a three-dimensional diagram of a heat dissipation fin set of FIG. 11A.

FIG. 11A is a schematic diagram of a projector of another embodiment of the invention. FIG. 11B is a three-dimensional diagram of a heat dissipation fin set of FIG. 11A. In the embodiment of a heat dissipation module 56A of the projector 50A shown in FIG. 11A and FIG. 11B, the configuration and action modes of the heat dissipation fin set 1100, the heat dissipation fins 1110, the non-turbulent region 1110a, the second turbulent region 1110b and the first turbulent region 1110c are similar to the configuration and action modes of the heat dissipation fin set 100, fins 110, non-turbulent region 110a, second turbulent region 110b and first turbulent region 110c of the heat dissipation module 56 of the projector 50 shown in FIG. 1 and FIG. 2, and the descriptions thereof are omitted herein. The main difference of the heat dissipation module 56A from the heat dissipation module 56 is that in the embodiment, the heat dissipation module 56A has no heat pipe, the heat dissipation fin 1110 has no hole through which the heat pipe may pass, and the heat dissipation fin set 100 is connected with the light source 54a as shown in FIG. 11A, so that the heat produced by the light source 54a may be transferred directly to the heat dissipation fin set 100 in the way of heat conduction. In addition, similar to the embodiment of FIG. 1, in part of the non-drawn embodiments, the fan 56b in FIG. 11A also may be located between the heat dissipation fin set 1100 and the lens 54c. Or, in the other non-drawn embodiments, the fan 56b also may be arranged at other appropriate positions to provide/produce heat-dissipating airflow F, so that the heat-dissipating airflow F passes through the heat dissipation fin set 1100.

Based on the foregoing, the embodiments of the invention have at least one of the following advantages or efficacies. In the above-mentioned embodiments of the invention, the turbulent structures of the heat dissipation fin set protrude from the surfaces of the heat dissipation fins, and the openings are formed in a three-dimensional direction perpendicular to the surfaces. In the above-mentioned embodiments of the invention, when the heat-dissipating airflow flows through the turbulent structures, each turbulent structure destroys the boundary layer of the heat-dissipating airflow and produces eddies, and besides flowing on the surfaces, the eddies are also guided by the openings to flow in the three-dimensional direction to increase the heat convection efficiency of the heat-dissipating airflow at the heat dissipation fins. Thereby, in the above-mentioned embodiments of the invention, under the condition of not increasing the rotational speed of the fan and the volume of the heat dissipation fin set, the heat dissipation capability of the heat dissipation module may be increased effectively to meet the high-brightness, low-noise and small-size design trend of projectors. In addition, in the above-mentioned embodiments of the invention, since there is no turbulent structure at the upstream area of the heat-dissipating airflow, the turbulent structures may be prevented from interfering with the flow of the heat-dissipating airflow in the upstream area to decrease the efficiency of the heat-dissipating airflow flowing toward the midstream area and the downstream area.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
  a casing;
  an optical engine module, disposed in the casing, wherein the optical engine module comprises:
    a light source, adapted to generate an illuminating beam;
    a light valve, adapted to convert the illuminating beam into an image beam; and
    a lens, adapted to convert the image beam into a projection beam; and
  a heat dissipation module, disposed in the casing, wherein the heat dissipation module comprises:
    a heat dissipation fin set, comprising at least one heat dissipation fin and at least one turbulent structure, wherein the heat dissipation fin has a surface, the surface comprises a first turbulent region and a second turbulent region, the first turbulent region is adjacent to the second turbulent region, the turbulent structure is disposed at least one of the first turbulent region and the second turbulent region, the turbulent structure protrudes from the surface, and an opening is formed between a top end of the turbulent structure and the surface.

2. The projector according to claim 1, wherein the heat dissipation module further comprises a fan, the fan is adapted to provide a heat-dissipating airflow, and the heat-dissipating airflow is adapted to flow from the second turbulent region to the first turbulent region.

3. The projector according to claim 1, wherein the heat dissipation module further comprises a heat pipe, and the heat pipe is connected with the second turbulent region.

4. The projector according to claim 3, wherein the heat pipe is connected between the heat dissipation fin set and the light source.

5. The projector according to claim 3, wherein the heat pipe is connected between the heat dissipation fin set and the light valve.

6. The projector according to claim 3, wherein the optical engine module further comprises a phosphor wheel, the heat dissipation module further comprises an another heat dissipation fin set, a heat-dissipating airflow is adapted to flow from the phosphor wheel to the heat dissipation fin set, and the heat pipe is connected between the heat dissipation fin set and the another heat dissipation fin set.

7. A heat dissipation module, comprising:
  a heat dissipation fin set, comprising at least one heat dissipation fin and at least one turbulent structure, wherein the heat dissipation fin has a surface, the surface comprises a first turbulent region and a second turbulent region, the first turbulent region is adjacent to the second turbulent region, the turbulent structure is disposed at least one of the first turbulent region and the second turbulent region, the turbulent structure protrudes from the surface, and an opening is formed between a top end of the turbulent structure and the surface.

8. The heat dissipation module according to claim 7, further comprising a fan, wherein the fan is adapted to provide a heat-dissipating airflow, and the heat-dissipating airflow is adapted to flow from the second turbulent region to the first turbulent region.

9. The heat dissipation module according to claim 7, further comprising a heat pipe, wherein the heat pipe is connected with the second turbulent region.

10. A heat dissipation fin set, comprising:
at least one heat dissipation fin, having at least one surface, wherein the surface comprises a first turbulent region and a second turbulent region, and the first turbulent region is adjacent to the second turbulent region; and
at least one turbulent structure, disposed at least one of the first turbulent region and the second turbulent region, and protruding from the surface, wherein an opening is formed between a top end of the turbulent structure and the surface.

11. The heat dissipation fin set according to claim 10, wherein the quantity of the at least one heat dissipation fin is multiple, and the heat dissipation fins are mutually stacked.

12. The heat dissipation fin set according to claim 10, wherein the turbulent structure is connected with the heat dissipation fin integrally.

13. The heat dissipation fin set according to claim 10, wherein the quantity of the at least one turbulent structure is multiple.

14. The heat dissipation fin set according to claim 13, wherein a part of the turbulent structures are arranged along an axis, an another part of the turbulent structures are arranged along an another axis parallel to the axis, and the turbulent structures on the axis are aligned with or staggered from the turbulent structures on the another axis.

15. The heat dissipation fin set according to claim 14, wherein a heat-dissipating airflow is adapted to flow along a flowing direction from the second turbulent region to the first turbulent region, and the two axes are parallel to or perpendicular to the flowing direction.

16. The heat dissipation fin set according to claim 13, wherein a part of the turbulent structures are disposed at the first turbulent region, and an another part of the turbulent structures are disposed at the second turbulent region.

17. The heat dissipation fin set according to claim 10, wherein the turbulent structure comprises a connecting portion and two supporting portions, the two supporting portions protrude from the surface, the connecting portion is connected between the two supporting portions, the top end of the turbulent structure is located at the connecting portion, and the opening is formed among the connecting portion, the two supporting portions, and the surface.

18. The heat dissipation fin set according to claim 10, wherein the heat dissipation fin has at least one slot, the turbulent structure comprises a plate and two supporting portions, the plate is inclined relative to the surface and has a free end, the two opposite sides of the plate are connected with the inner edge of the slot respectively by the two supporting portions, and the free end forms the top end of the turbulent structure.

19. The heat dissipation fin set according to claim 10, wherein the heat dissipation fin has at least one hole in the second turbulent region, and a heat pipe is configured to pass through the hole.

20. The heat dissipation fin set according to claim 10, wherein the surface further comprises a non-turbulent region, the second turbulent region is located between the first turbulent region and the non-turbulent region, and the non-turbulent region has no turbulent structure.

* * * * *